July 9, 1946.    W. S. CLOUD    2,403,482
METHOD AND APPARATUS FOR WRAPPING ARTICLES
Filed July 2, 1941    15 Sheets-Sheet 1

INVENTOR.
William S. Cloud
BY John R. Porter
ATTORNEY.

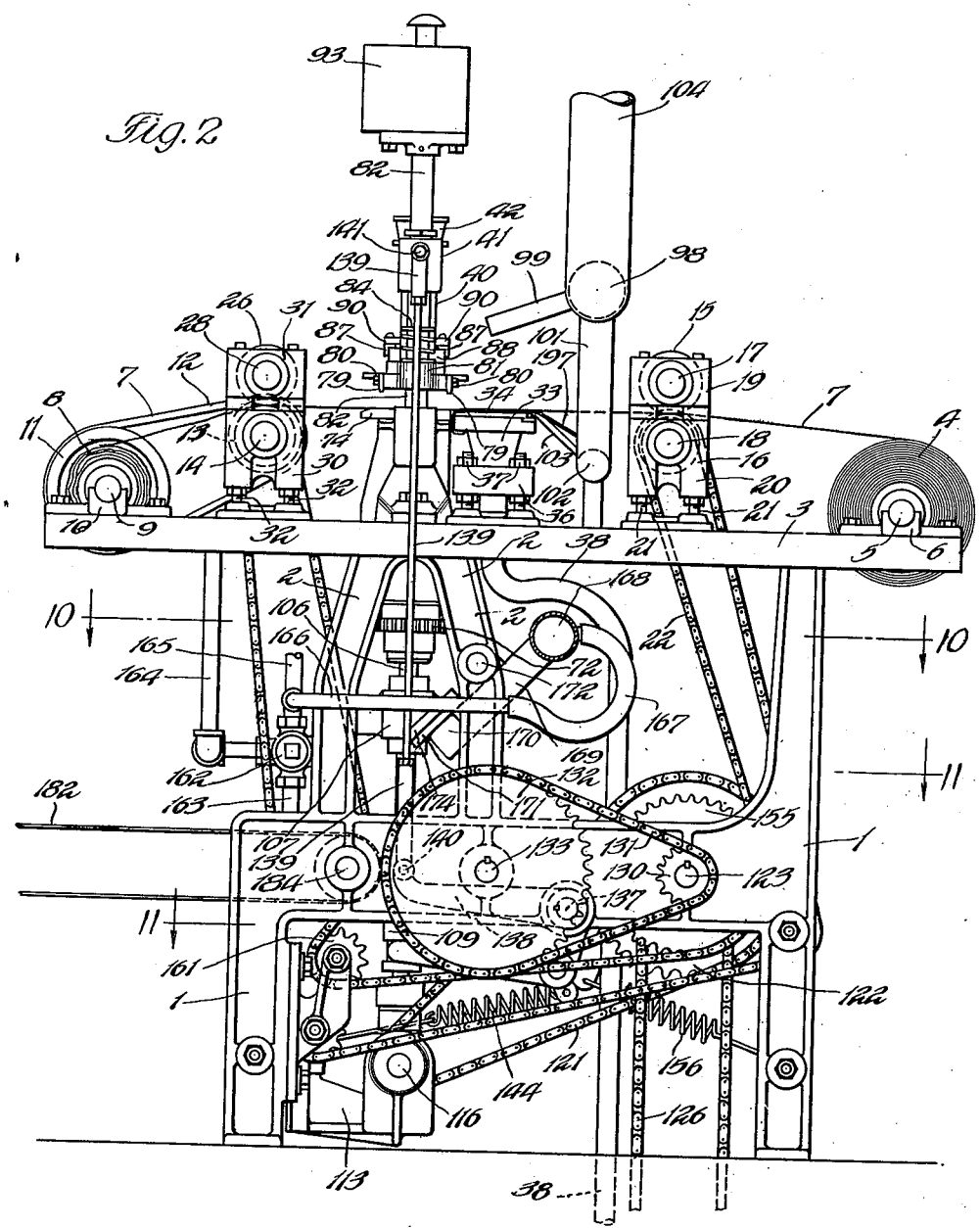

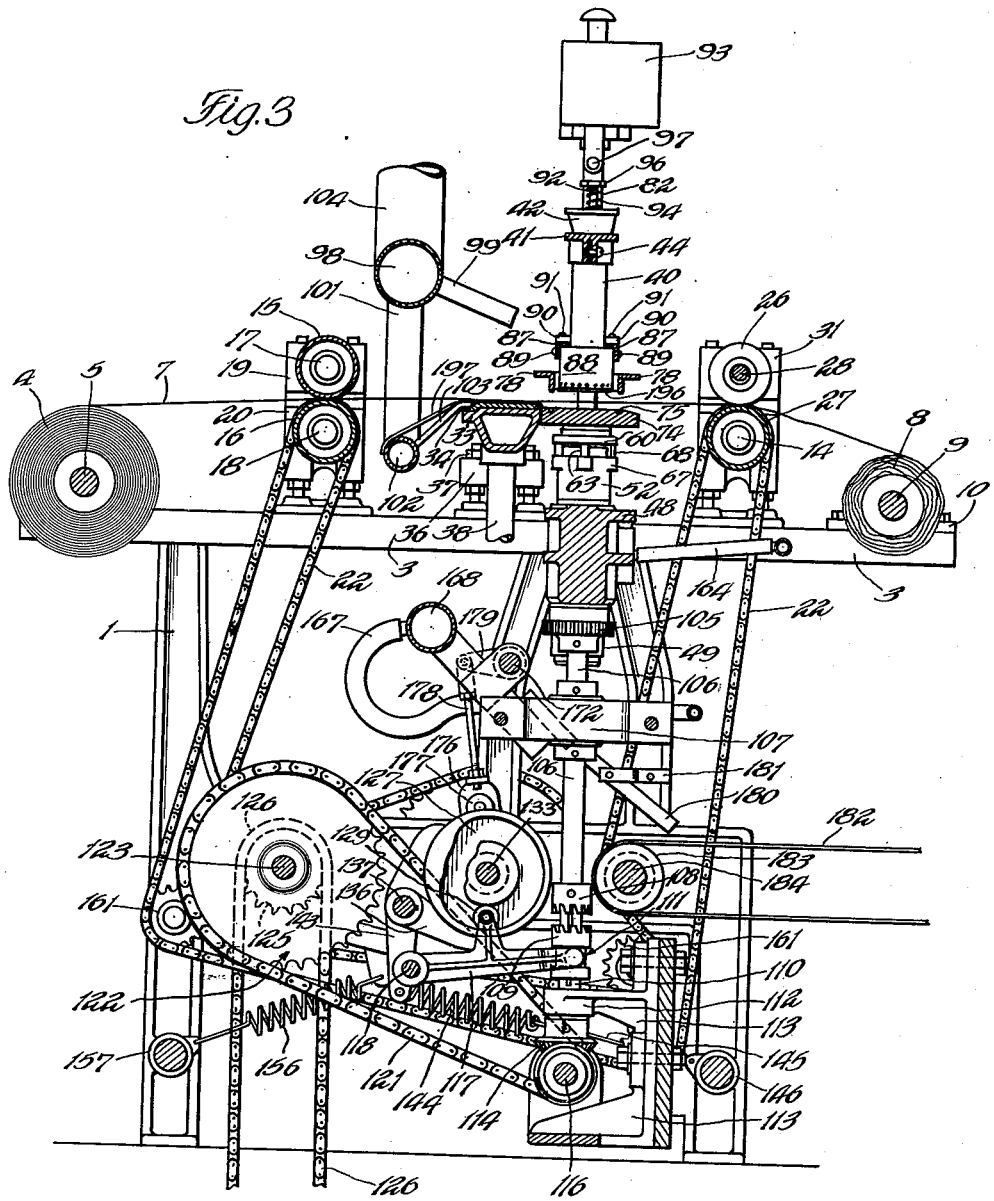

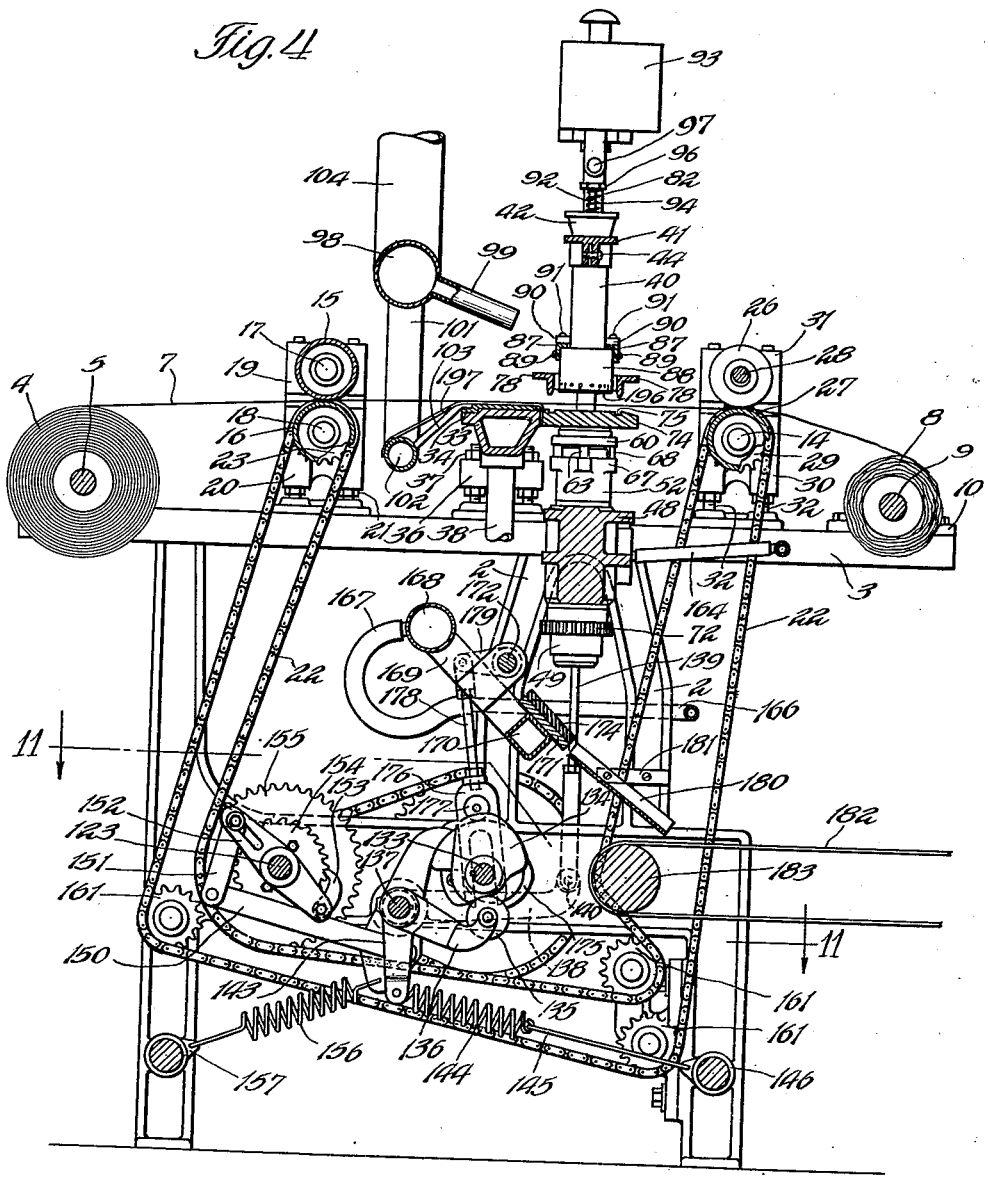

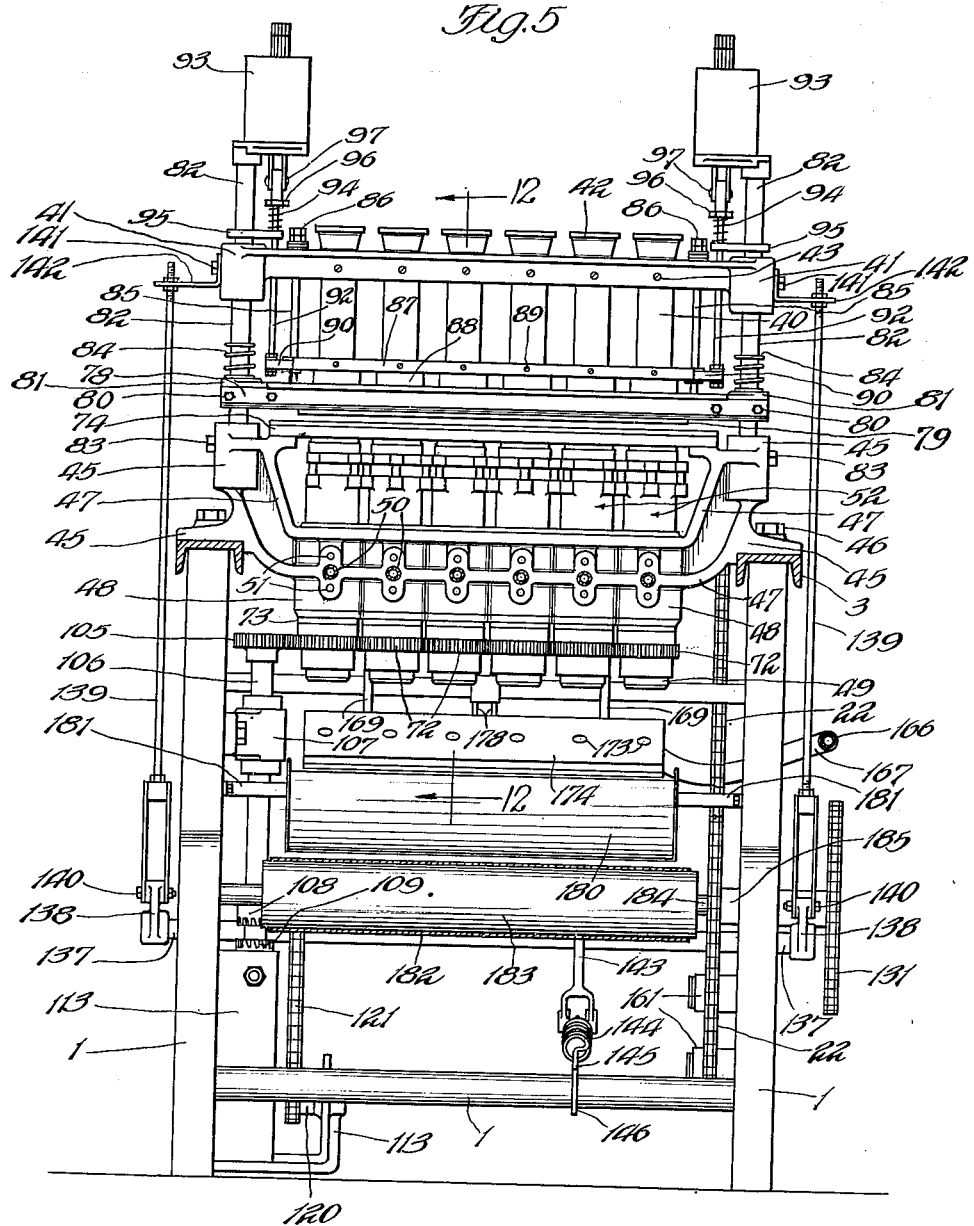

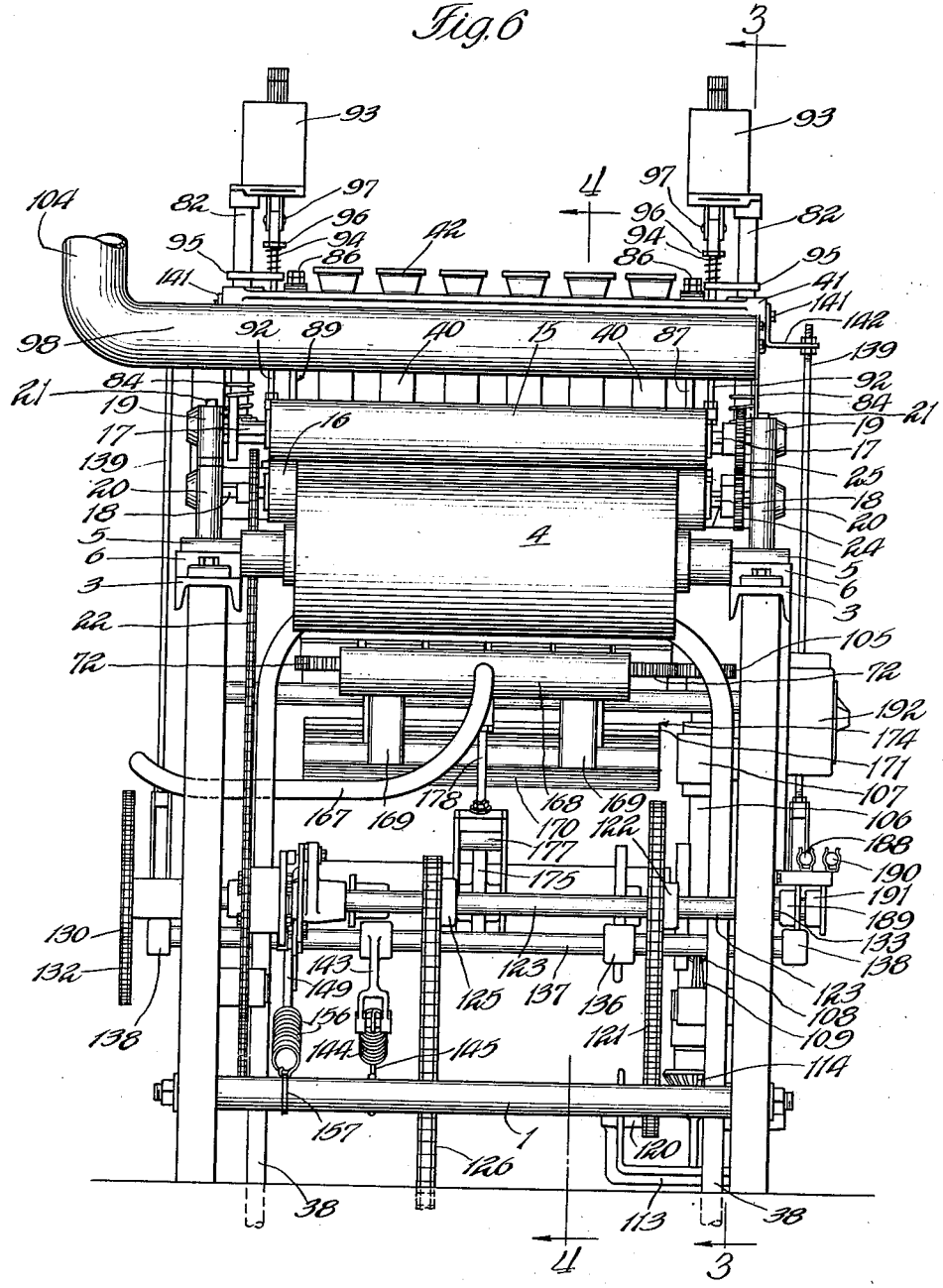

July 9, 1946. W. S. CLOUD 2,403,482
METHOD AND APPARATUS FOR WRAPPING ARTICLES
Filed July 2, 1941 15 Sheets-Sheet 7
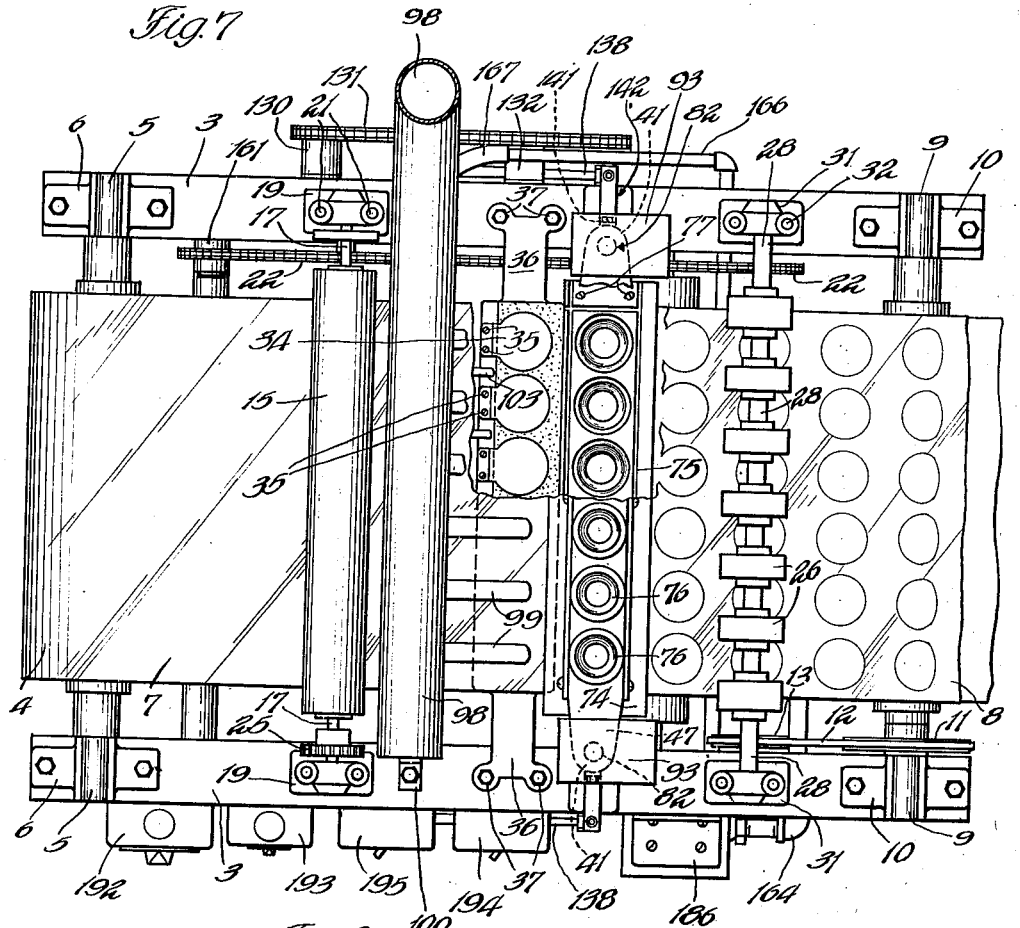
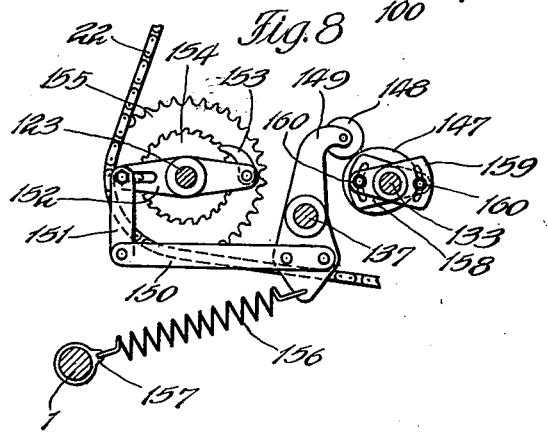
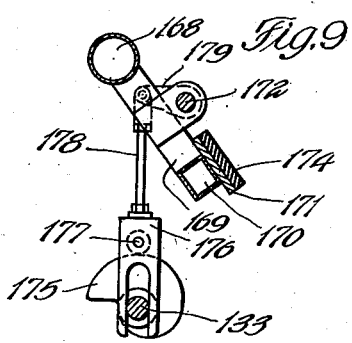
INVENTOR.
William S. Cloud
BY John R. Porter
ATTORNEY

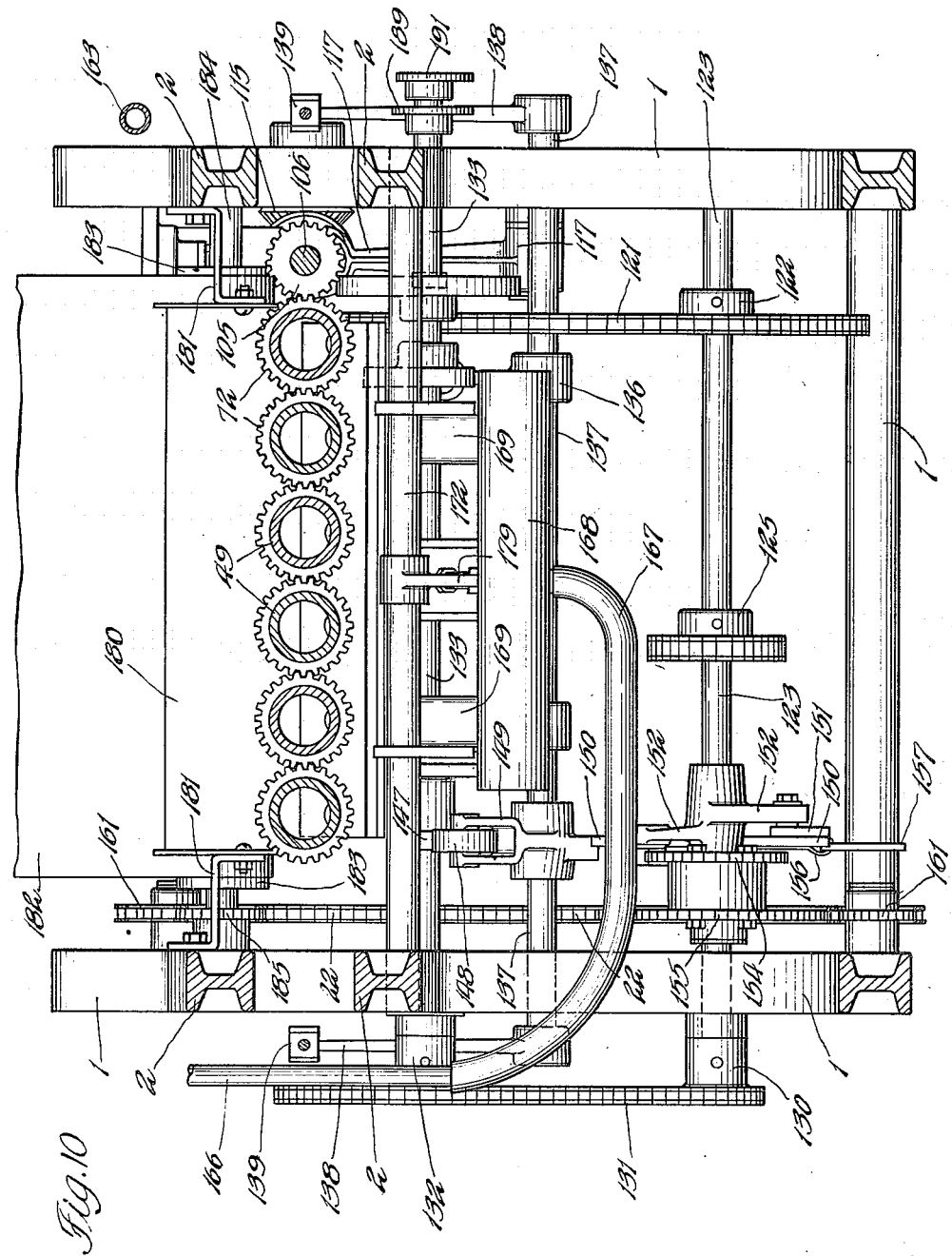

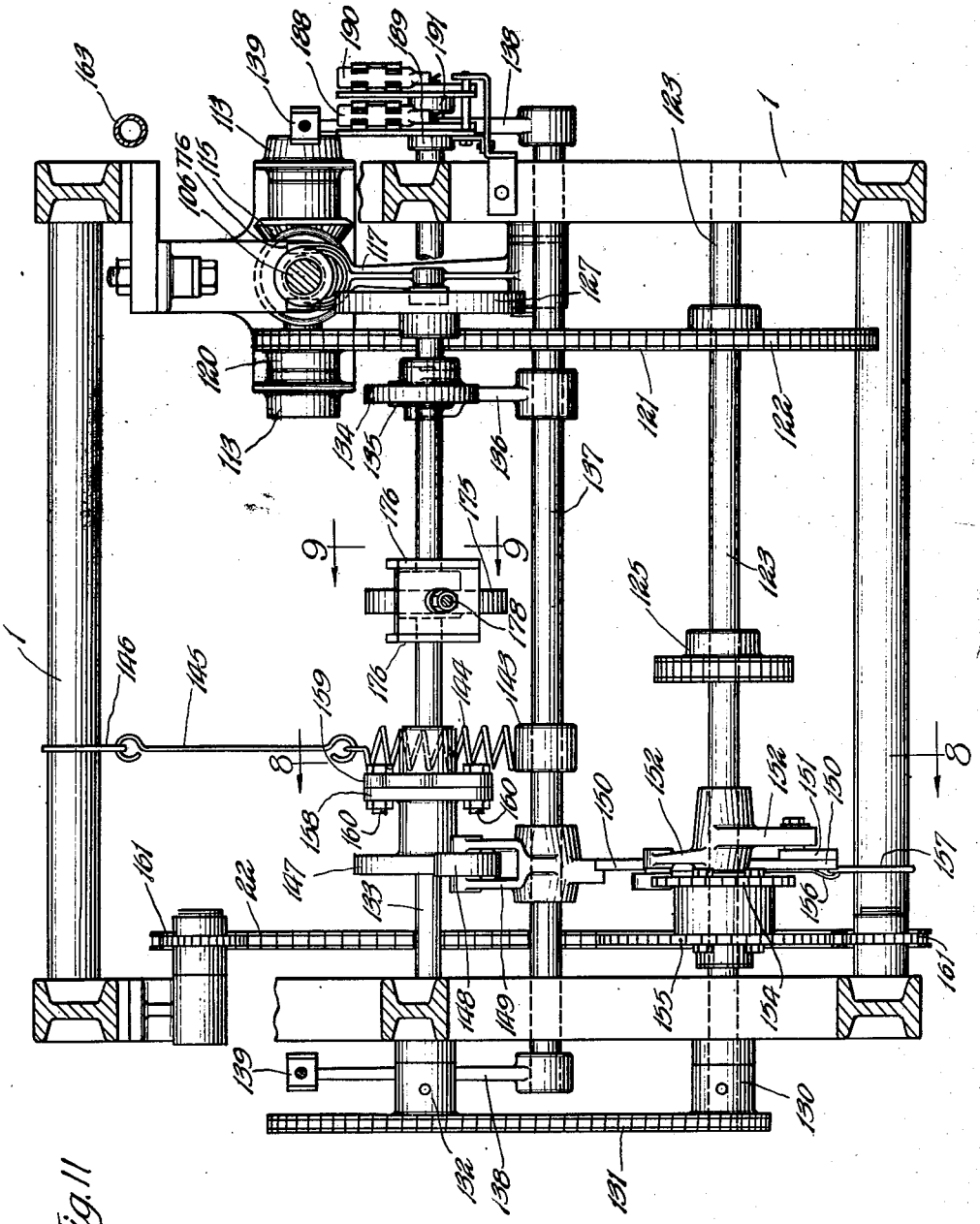

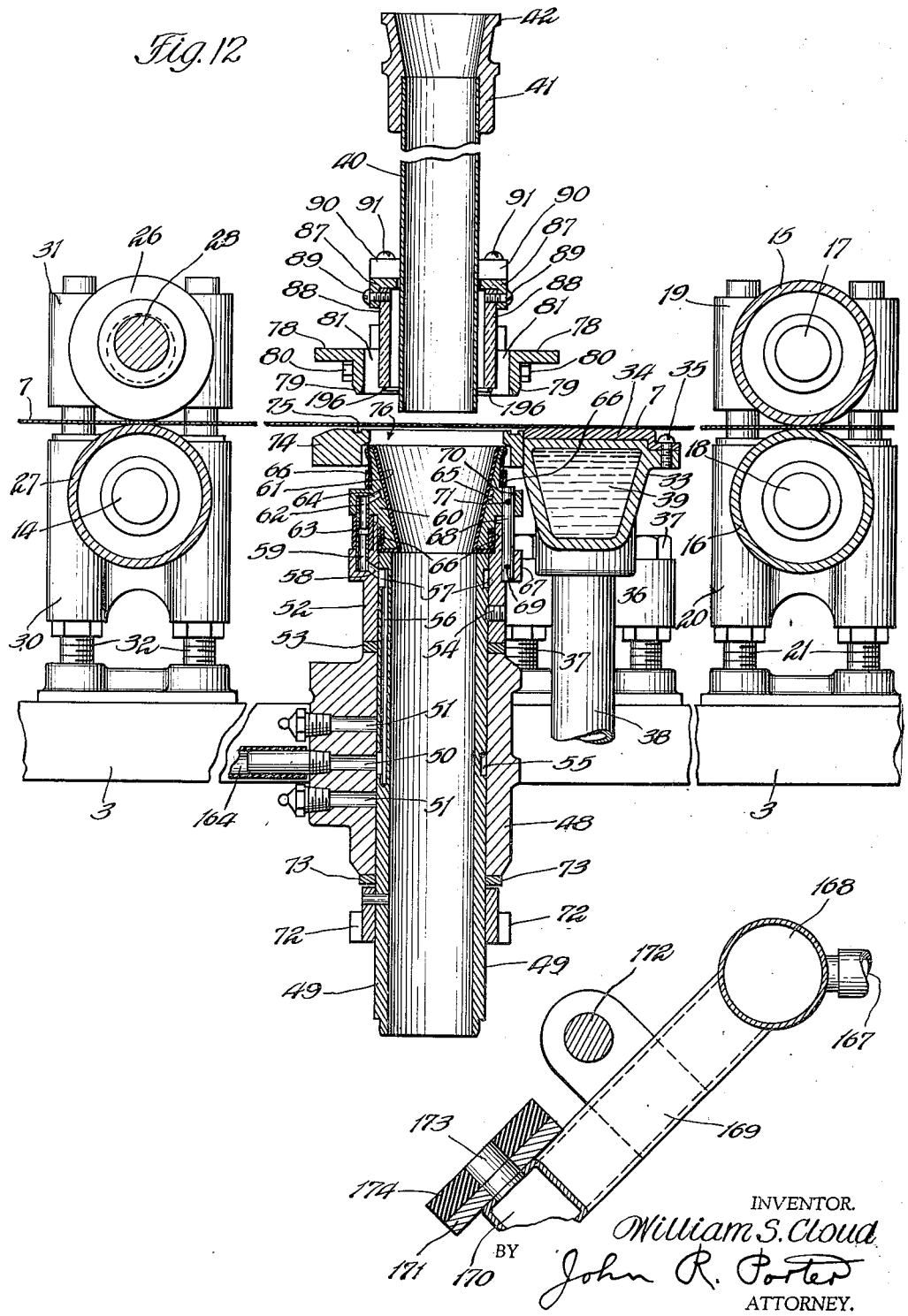

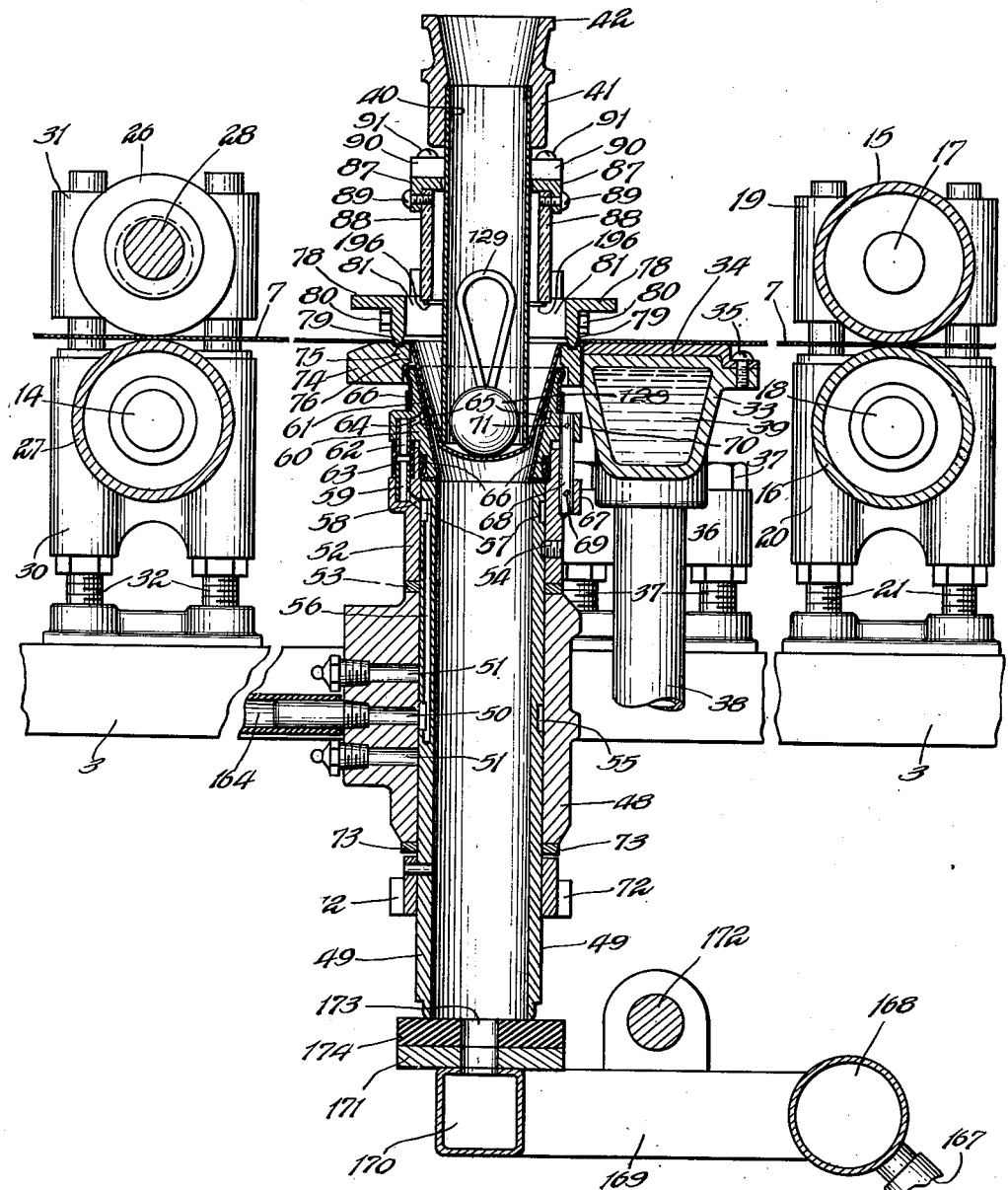

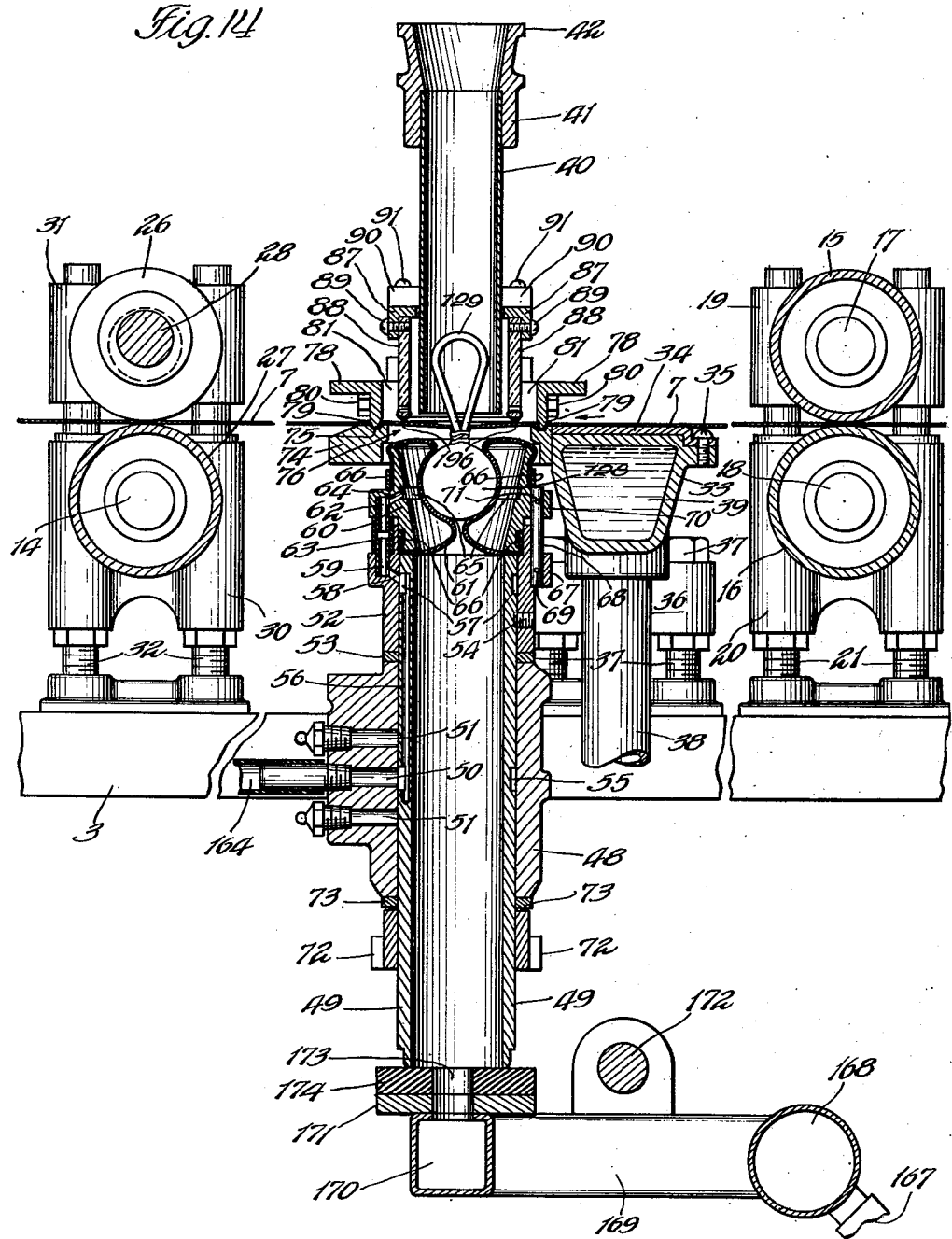

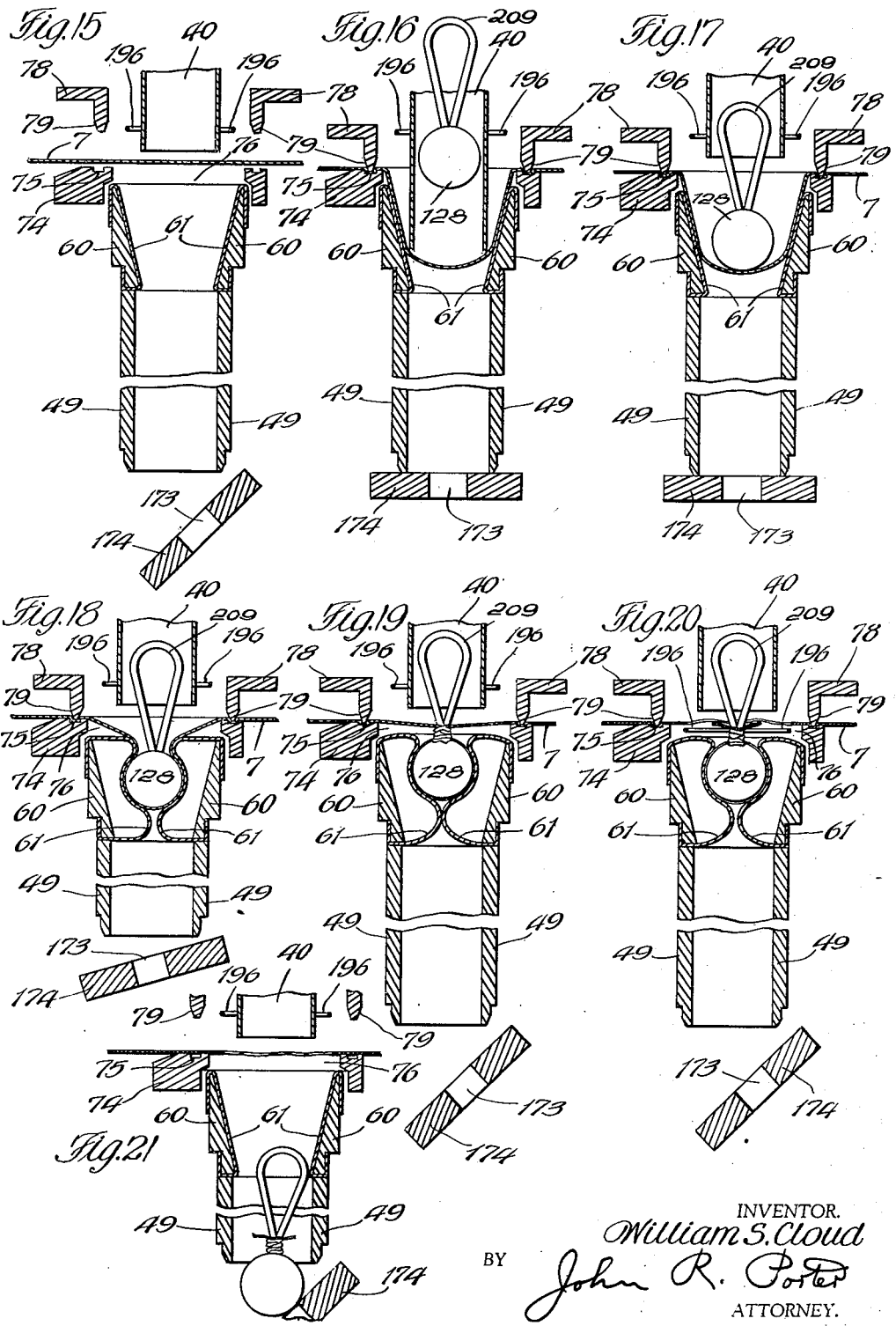

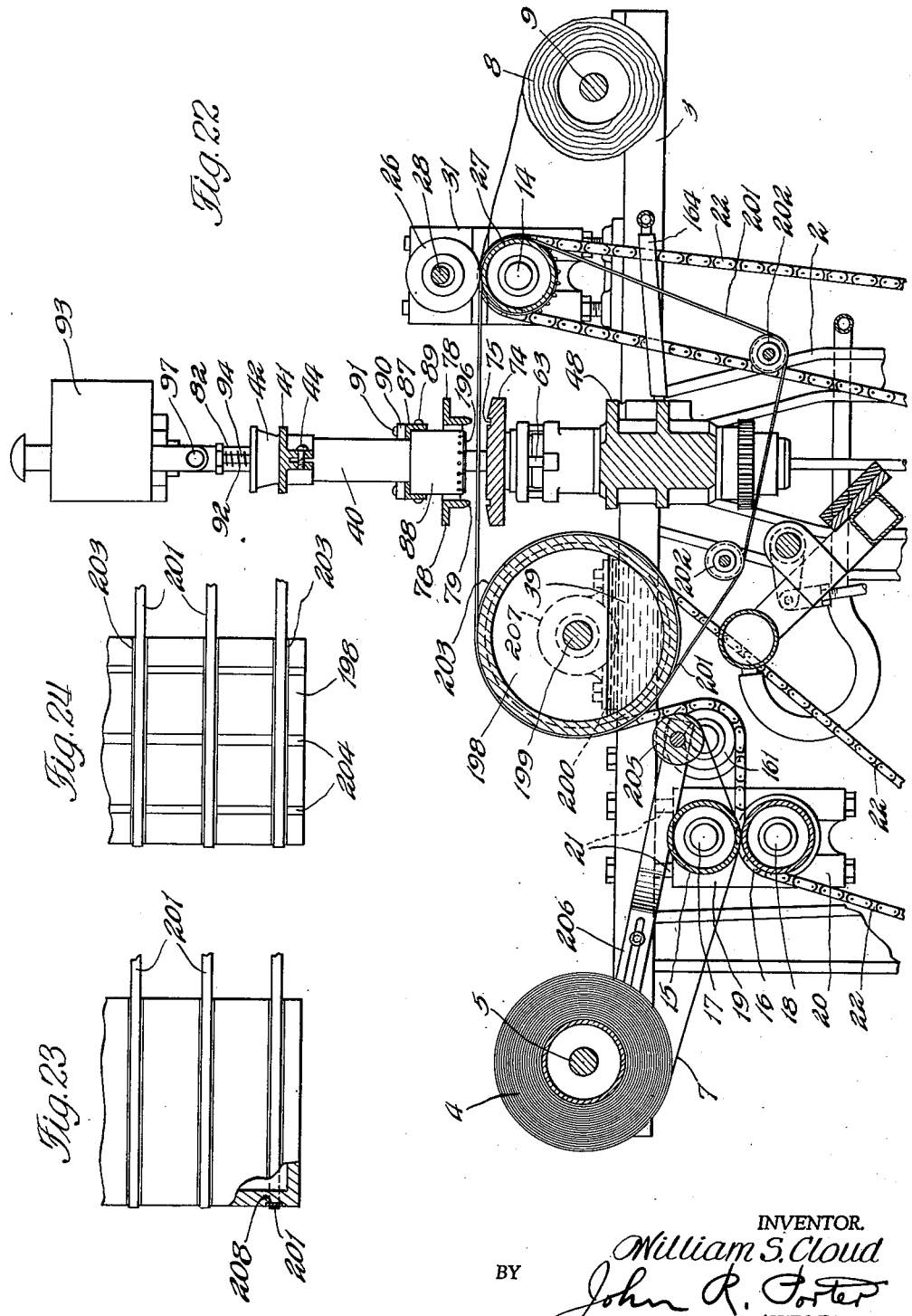

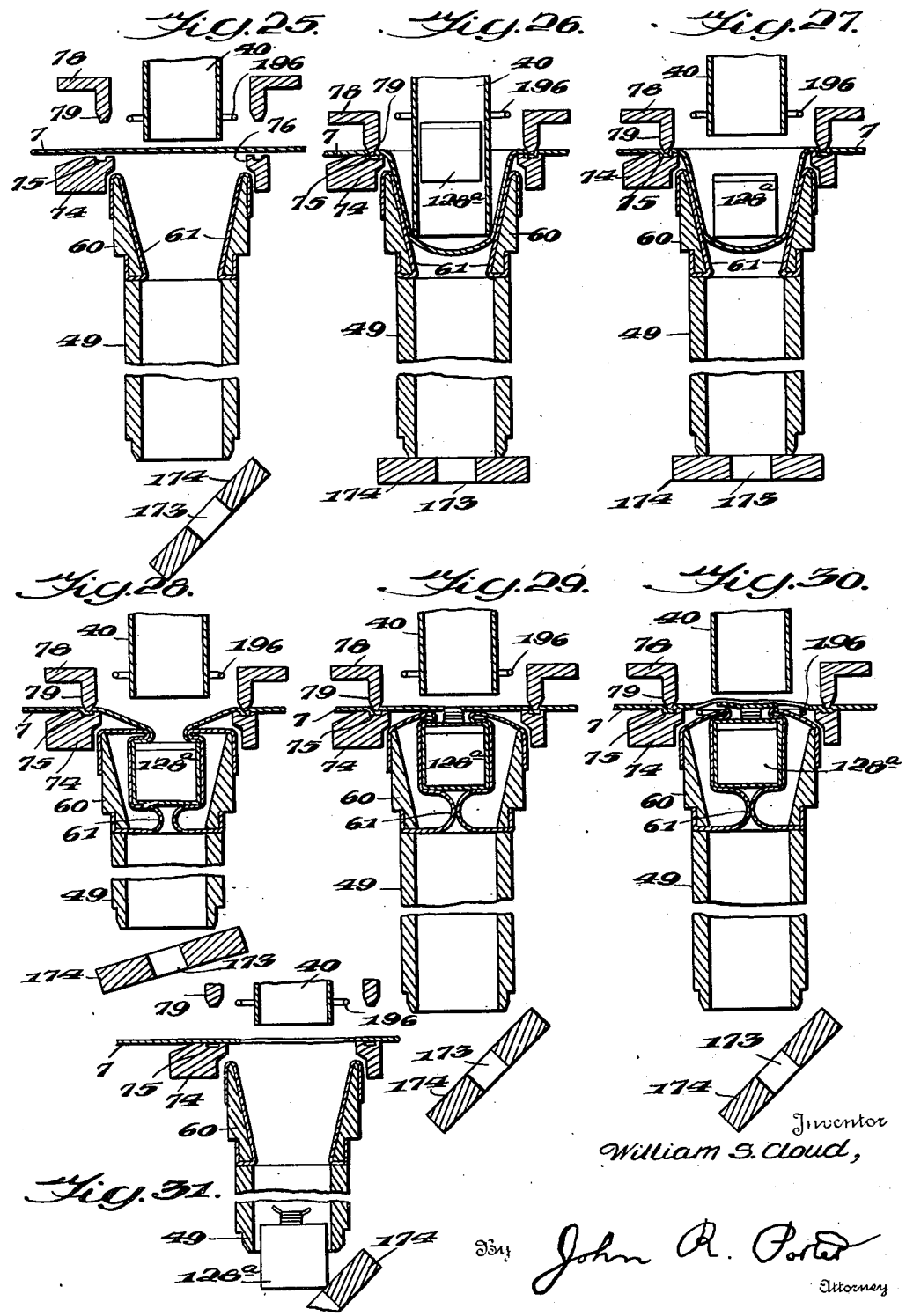

Patented July 9, 1946

2,403,482

UNITED STATES PATENT OFFICE 2,403,482

METHOD AND APPARATUS FOR WRAPPING ARTICLES

William S. Cloud, Wilmette, Ill.

Application July 2, 1941, Serial No. 400,854

17 Claims. (Cl. 18—19)

This invention relates to methods of enclosing articles in thermoplastic sheet material and to apparatus for practicing such methods.

There are numerous, well-recognized advantages in wrapping articles intended for retail sale or display with material which conforms to the exact size and shape of the articles, especially where the material is transparent. However, these obvious advantages of the completed package are offset by the difficulties encountered in the high speed wrapping operation which is required. Numerous methods have been devised for wrapping articles in material such as Pliofilm, but these methods usually involve hand operations, slow speed, high cost, or unattractive packages.

I prefer to use a material which is stretchable, thermoplastic and sealable. These requirements are met by a rubber hydrochloride material now sold commercially under the name Pliofilm. Other material, such as sheet rubber, may be used but with less satisfactory results.

One of the objects of my invention is to provide methods and the means for drawing a web of sheet Pliofilm from a roll of the same, heating predetermined portions of the film sufficiently to cause it to become plastic, stretching predetermined portions of the film into pocket-like recesses, placing the articles in said pockets, holding the film tightly against the articles while simultaneously twisting both the articles and the film whereby the articles are completely enclosed by said film.

Another object of my invention is to form pocket-like recesses or extensions in material such as sheet Pliofilm by suspending the sheet material over a series of openings and forcing tube-like means against the suspended sheet.

Another object is to provide fast, economical, and efficient means for wrapping articles which vary greatly in size and shape without requiring adjustment of the machine. For example, I have found that my method and apparatus can be used to wrap such articles as oranges, lemons, eggs, pieces of candy, ball bearings, light bulbs, nuts and bolts, coffee, sugar, flavored powder such as is used in making soft drinks and a great variety of other articles which it is not deemed essential to list in detail at this time. It should be noted however that I also have used my invention to package predetermined quantities of liquids.

Another object of my invention is to provide a method of wrapping articles in such a manner as to reduce to a very minimum the amount or length of seam in the finished package. This, in turn, reduces the number of points of possible leakage for moisture and air, which is particularly advantageous in packaging articles of food. The extent of air tightness will depend upon the weight of the film and the amount of twisting.

A still further object is to wrap articles with a minimum amount of material and with very little wasted scrap. The use of a thermoplastic, stretchable material, such as Pliofilm, makes the attainment of this object possible. For example, in wrapping a spherical object such as an orange, with non-stretchable material the area of the wrapper must be 3½ times the surface area of the orange. The excess wrapping material in such case is consumed in the form of wrinkles and folds. This is not true where my invention is practiced. According to my method the wrapping material used is uniformly distributed over the surface of the article, wrinkles and folds are substantially eliminated, and the thickness of the wrapping material is substantially the same over the entire area of the article.

A still further object is to provide a multiple wrapping apparatus which requires use of less material per article to be wrapped than is possible where the articles are wrapped individually.

An additional object is to provide a method and apparatus for wrapping in whole or in part articles which have protruding therefrom a stick or handle. For example, my invention may be used in wrapping candy suckers having such protrusions. In such case both the article and the handle may be enclosed in the wrapper or the handle portion may be left outside the completed package.

Other objects and advantages will appear hereinafter.

A preferred embodiment of the invention selected for purposes of illustration is shown in the accompanying drawings, in which, Figure 1 is a side elevation of the complete machine, shown from the right side.

Figure 2 is a side elevation of the complete machine, shown from the left side.

Figure 3 is a longitudinal section on line 3—3 of Figure 6.

Figure 4 is a longitudinal section on line 4—4 of Figure 6.

Figure 5 is a vertical section on line 5—5 of Figure 1.

Figure 6 is an end elevation of the complete machine shown from the feed end.

Figure 7 is a plan view of the entire machine.

Figure 8 is a detail section on line 8—8 of Figure 11.

Figure 9 is a detail section taken on line 9—9 of Figure 11 and shows the cam means for moving the vacuum mechanism into operating position.

Figure 10 is a plan section taken on line 10—10 of Figure 2.

Figure 11 is a plan section taken on line 11—11 of Figure 2.

Figure 12 is a vertical section taken on line 12—12 of Figure 5.

Figure 13 is a view similar to that of Figure 12, shown in changed position.

Figure 14 is a view similar also to that of Figure 12, shown in a still further changed position.

Figures 15 to 21 are diagrammatic views illustrating the various changed positions in the operation of wrapping a candy sucker having a projecting handle or stick.

Figure 22 is a modified form of my apparatus showing the heating unit as a cylindrical drum.

Figure 23 is a fragmentary plan view of the heating drum, showing grooves and the position of belts in said grooves.

Figure 24 is a fragmentary plan view of a modified form of said heating drum, showing crossgrooves and cross-strips.

Figures 25 to 31 are diagrammatic views similar to Figures 15 to 21 respectively, illustrating the various changed positions in the operation of wrapping a rectangular or cylindrical object such as a box of face powder or jar of cosmetic material.

Figure 1:
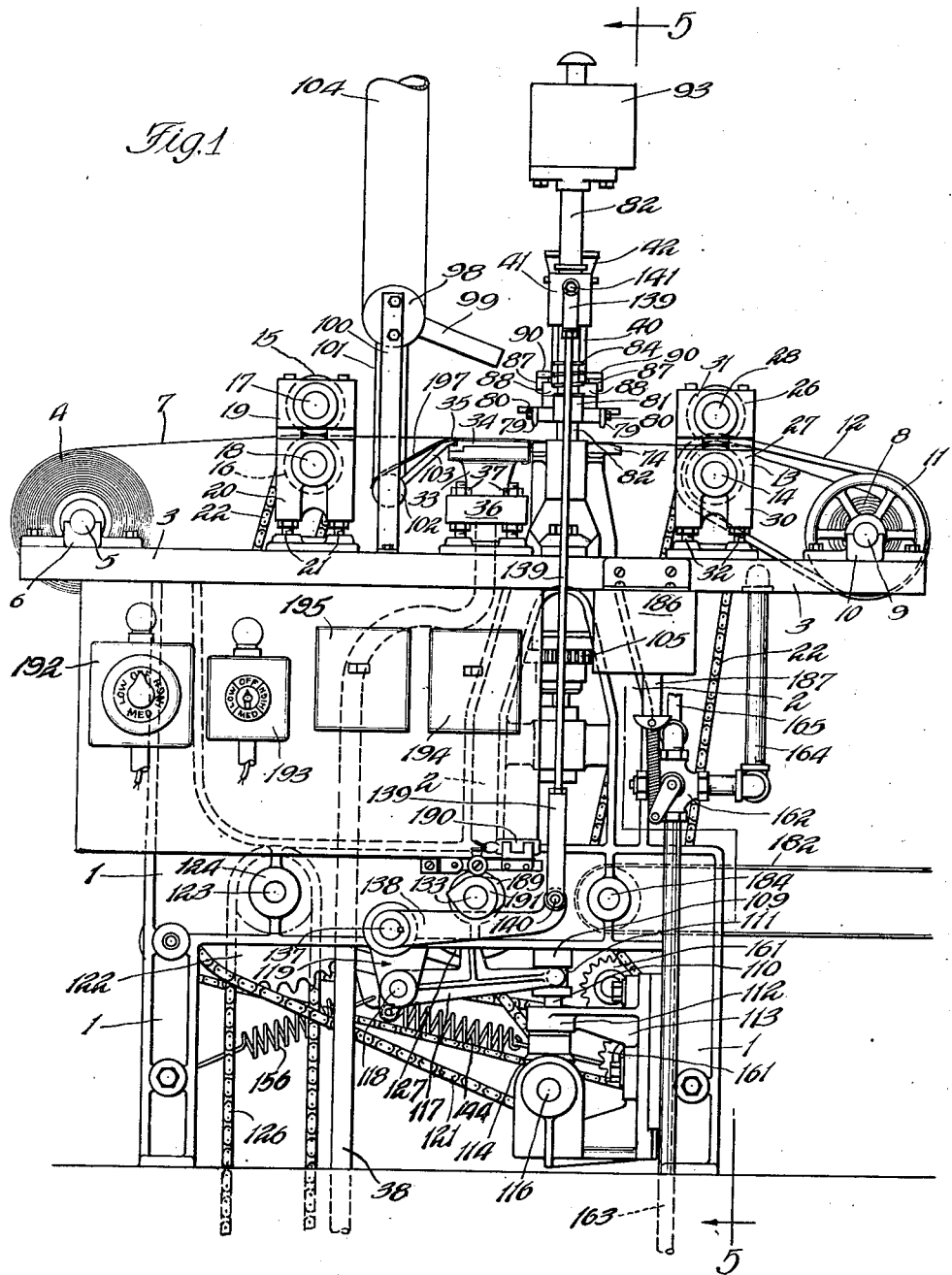

As already indicated, I prefer to use pliofilm as the wrapping material. It is obtainable now in rolls or webs of sufficiently great length to satisfy the needs of a continuous and high speed wrapping method such as described herein. The width of sheet used depends upon the size of the articles to be wrapped and the number to be wrapped simultaneously, in a row, across the sheet. A variety of widths, up to 52 inches is now available commercially.

The thickness of the material used will depend upon the weight, shape, size, and contour of the articles to be wrapped and also the extent to which it is desired to stretch the film. Pliofilm is now available in thicknesses ranging from $2/10,000$ of an inch to $24/10,000$ of an inch. Two sheets in superimposed relation, may be run through my apparatus, and this provides another way for determining and controlling the thickness of the article covering.

As already indicated, my method and apparatus may be used to wrap articles having a variety of shapes and sizes. For purpose of illustration, I have indicated herein how articles such as candy suckers may be wrapped. This type of article is one of the most difficult to wrap because ordinarily it has a handle protruding from the outer surface thereof for a distance of from 2 to 4½ inches. Despite the difficulty presented by such a handle, my invention enables a clean, smooth, and complete wrap to be made. The wrapping material is twisted tightly about the handle at a point adjacent the candy piece and, because of the thermoplastic character of the Pliofilm, the wrapper is substantially sealed. This, of course, is one of the objects of my invention and is a decided advantage in wrapping food articles, reducing air and moisture leakage.

I have also illustrated in Figures 25 to 31 how my invention may be used to wrap articles which have no handle or long protrusion. In such case the sealing of the package is more easily and completely accomplished.

Of course it should be understood that in the case of articles having handles, such as candy suckers, the entire article, candy and handle, may be wrapped and sealed by my method. A slight adjustment of the apparatus is necessary in order to provide deeper pockets in the wrapping material sheet.

Referring to Figure 1, the apparatus is supported by frame 1, inverted U-shaped support members 2, angle-irons 3 mounted on members 1 and 2 and running horizontally for the entire length of the machine. It is upon said angle-irons 3 that many of the principal moving parts of the machine are fastened.

A roll of Pliofilm 4 (Figure 1) is mounted in the usual manner on shaft 5 which is free to rotate in half-bearings 6 which rest upon and are bolted to angle-irons 3. The film sheet 7 is drawn from roll 4 by means of wringer rolls 15 and 16 mounted, respectively, on shafts 17 and 18 rotating in block bearings 19 and 20, both of these bearings being mounted on vertical bolts 21 and secured to angle-irons 3. On shaft 18 of lower wringer roll 16 (Figure 4) is mounted sprocket 23 which serves to drive this shaft by transmitting power in the following manner. Chain 22 is wrapped part way around sprocket 155 (Figure 8). This sprocket is rigidly fastened to ratchet wheel 154 and these are free to rotate on shaft 123. Ratchet wheel 154 is actuated by pawl 153 on the end of arm 152 which also rotates freely about shaft 123. Pawl 153 is moved by the action of cam 147 rigidly mounted to collar arm 158 which in turn is adjustably fastened to collar arm 159 by means of bolt 160. Collar arm 159 is rigidly mounted on shaft 133. The timing of this cam may thus be changed somewhat by rotating one of these arms with respect to the position of the other. Cam 147 raises and lowers cam wheel 148 on the end of arm 149 which is pivotally mounted on shaft 137 and it thus gives movement to horizontal arm 150 which in turn moves vertical arm 151 and arm 152 already mentioned. Spring 156, attached to frame 1 at one end by means of collar 157 and to the lower portion of arm 149 at the other end, serves to hold cam roller 148 in contact with the surface of cam 147. Cam 147 is rotated by shaft 133 (Figure 11) which is driven by sprocket 132, this sprocket being propelled by roller chain 131 which derives its power from sprocket 130 on main countershaft 123. Countershaft 123 is driven by sprocket 125 through chain 126 (Figure 6) from an electric motor or other suitable source of power not shown. Countershaft 123 is mounted in suitable bearings 124 (Figure 1) on main frame base 1. It is thus seen that one complete revolution of shaft 133 (Figure 8) will cause sprocket 155 to rotate any predetermined amount and this will be transmitted through chain 22 to sprocket 23 (Figure 4) and this will rotate shaft 18 and lower wringer roll 16. At the other end of this shaft 18 is fixedly mounted thereon spur gear 24 (Figure 6) and directly above this gear and meshing therewith is another spur gear 25 with the identical number of teeth fixedly mounted on upper wringer roll shaft 17. It is evident that in this manner both wringer rolls 15 and 16 are driven with the same peripheral speed and will draw the film 7 (Figure 2) uniformly from supply roll 4.

Near the delivery end of the machine I have a more or less similar construction of rollers which serve to draw film 7 from the first set of rollers just mentioned. The upper rollers 26 (Figures 7 and 12) are loosely mounted on shaft 28 which shaft is held in block 31 mounted on vertical bolts 32 attached to angle-iron frame 3. The lower roller 27 (Figure 12) of this set is rigidly mounted on shaft 14 which rotates in block 30 fastened to pins 32 and supported by angle-iron frame 3. On one end of shaft 14 (Figure 4) is sprocket 29. This sprocket is caused to rotate by chain 22 in a manner similar to the description previously given for wringer roll 16. It is apparent that these sets of rollers serve to draw film 7 from supply roll 4, drawing said film 7 through the various parts of the apparatus as will be described hereinafter.

After film 7 has been drawn from roll 4 (Figure 1) by means of wringer rolls 15 and 16 as above described, and has been moved forward through the machine by wringer rolls 26 and 27, film 7 is drawn over hot plates or grids 34 (Figure 12). These hot plates are held against the heating manifold 33 by screws 35. Manifold 33 is held in position by extension plates 36 which are supported on angle-iron frames 3 by stud bolts 37. Hot liquid or steam 39 is conducted to manifold 33 through pipe 38 which leads to a suitable source of hot liquid or steam not shown. Hot plates 34 may be of any desired shape and size. In Figure 7 they are shown as being circular in shape and between these plates there are gaps which it may be found desirable to cool with a blast of air. A method of doing this is indicated in Figure 1 where air is conducted from a suitable fan by means of pipe 104 which leads to manifold 98 from which air is drawn by nozzles 99 and pipe 101. The air from nozzles 99 is used to cool the working parts of the machine, if desired, and air from pipe 101 is conducted to manifold 102 from which small nozzles 103 conduct the air to the gaps between individual hot plates 34. Air baffle 197, of impervious material, prevents this cold air from striking film 7 (Figure 1). Air manifold 98 is supported from main frame 3 by means of vertical bracket 100.

It is evident from the above statement that film 7 will rest upon hot plates 34 for a predetermined length of time, dependent upon the speed of the machine and the shape of the cams involved. The time interval allowed for the film to rest on hot plates 34 is sufficient to render said film 7 thermoplastic and in this state the film is next drawn to a position underneath plunger tubes 40 (Figure 4). Directly below tubes 40 is cast iron block 45 (Figure 5). Block 45 is fastened to angle-iron frame 3 by stud bolts 46. From the point of being attached to frame 3 at 46, cylinder block 45 has two arm-shaped members 47 which support or carry cylinders 48. At the top of arms 47 is fastened bed-plate 74 (Figure 5) by means of screws 77 (Figure 7). In bed-plate 74 is a groove 75 cut completely around the length and width of the plate. Bed-plate 74 also has in it circular openings 76 (Figure 7) which are sufficiently large to permit tubes 40 together with stretched film 7 to enter (Figure 16), as will be described more fully hereinafter.

Directly above lower bed-plate 74 is a corresponding upper clamp plate 78 (Figure 3) which also is of rectangular shape and it has a contacting edge 79 (Figure 2) adapted to cooperate with groove 75 (Figure 3) to firmly hold film 7. Upper clamp plate 78 is movable vertically whereas lower bed-plate 74 is immovable. The movement of upper clamp plate 78 is produced in the following manner. Plate 78 is fastened to slidably mounted blocks 81 (Figure 5) by means of bolts 80. Sliding blocks 81 are mounted on vertical shafts 82 and are raised by the upward movement of rods 85, the upper ends of which are lifted by casting 41 to which they are held by lock nuts 86. Clamp plate 78 is lowered into clamping position by the downward movement of casting 41 which slides down on shaft 82 until it compresses springs 84 against the upper surface of blocks 81. This operation clamps Pliofilm sheet 7 in position for succeeding operations about to be described. Plunger tubes 40 are rigidly held in casting 41 (Figure 12) by set-screws 43 (Figure 5). The top of casting 41 includes funnel-shaped openings 42 into which the articles 128, to be wrapped, are dropped. Clamp screws 44 (Figure 3) at each end of casting 41 are for the purpose of allowing this casting to compensate for different sizes of tubes 40, as it may be found desirable to use.

With Pliofilm sheet 7 rigidly held in position, tubes 40 are lowered by the downward movement of casting 41, this action being caused by connecting arms 139 (Figure 5) which are held to casting 41 by extension bracket 142 at the upper end of connecting arms 131 and pivot bolts 141 hold bracket 142 to casting 41, the connecting arms 139 being actuated by the eccentric arms 138 on shaft 137 through bolts 140. Shaft 137 (Figure 4) is oscillated by means of arm 136 on the end of which is cam roller 135 held against cam 134 by spring 144 on rigid arm 143, rod 145, and ring 146 on a cross-rod of main frame 1. Cam 134 (Figure 4) is rigidly mounted on shaft 133 which is rotated by sprocket 132 (Figure 2) on the end of shaft 133, this sprock being driven in turn from main countershaft 123 through sprocket 130 and connecting chain 131 (Figure 11).

Immediately prior to tubes 40 reaching the bottom of their stroke (Figures 13 and 16), the opening in the bottom of each tube 49 (Figure 13) is closed by vacuum plate 171 and a partial vacuum is created in each tube 49 of sufficient strength to hold the stretched Pliofilm in its distended position while plunger tube 40 recedes from its lowermost position (Figure 17). The mechanical movements involved in the creation of this partial vacuum are as follows. Cam 175 (Figure 9) on shaft 133 rotates and lifts cam roller 177 which is mounted in U-shaped member 176 on the lower end of arm 178, thus moving lever arm 179 upward and causing shaft 172 to rotate in a clockwise direction. Vacuum manifold 170 is fastened to hollow arm 169 which is rigidly mounted on shaft 172 so that this entire assembly rotates in a clockwise manner when arm 178 is raised.

On vacuum manifold 170, plate 171 is fastened and a rubber gasket 174 is suitably glued thereto. Openings 173 (Figure 12) are made in gasket 174 in such positions that they will match the openings in the bottom of tubes 49 when the vacuum pivotal assembly is in closing position as illustrated in Figure 13. Air is withdrawn from tubes 49 by means of a vacuum pump, not shown, but from which pipe 165 (Figure 2) leads to pipe 166, thence to flexible hose 167, and then directly to vacuum manifold 168 (Figure 12). There are no valves in this vacuum line so that it will be apparent that no partial vacuum is created by the pump until the vacuum assembly engages the bottom of tubes 49, at which time a partial vacuum is quickly created. This partial vacuum will hold the distended Pliofilm 7 substantially in its lowermost position until the next operation takes place, which is the seizing of articles 128 by what I call article holders, now to be described. It is assumed, of course, that articles 128 have been deposited in funnel-shaped openings 42 (Figure 12) of tubes 40 at sometime during the downward stroke of tubes 40 or no later than immediately prior to the operation of the article holders.

Article holders 60 (Figure 12) are tapered metal castings the inside walls of which are covered with loose rubber or other flexible, impervious sleeves 61. Sleeves 61 are folded back over the top of tapered holders 60 and fastened on the outside walls thereof by wire rings 66 which fit into annular grooves, not shown, cut around the outside circumference of holders 60. Sleeves 61 are similarly fastened at the bottom of holders 60 by being folded around the lower ends of said holders and held by wire rings 66 in additional annular grooves not shown. In this manner an air-tight compartment is formed between each sleeve 61 and the inner wall of each holder 60. Air is either forced to each such compartment or withdrawn from it by duct 64 which connects at one end with annular groove 65 around the inside circumference of holder 60. The other end of each duct 64 leads to pipe nipple 62 screwed into holder 60 and extending downward a sufficient distance to enable a rubber hose 63 or other suitable fitting to be attached thereto. Each hose 63 is connected to an additional pipe nipple 59 the function of which will be described later.

Article holders 60 are held in position by means of projections or shoulders 70 which are bored to fit over vertical pins 68 and are fixed thereto by set-screws 71 (Figure 12). Holders 60 are supported by hubs or collars 52. Hubs 52 are rigidly fastened to vertical tubes 49 by means of set-screws 54. Between hubs 52 and main cylinder block 48 there are interposed washers 53 which are used as spacers or thrust bearings. Vertical pins 68, already mentioned are fastened rigidly into projections 67 of hubs 52 by set-screws 69. Pipe nipples 59 are screwed into these same projections 67 (Figure 12) and lead to angular ducts 58 bored through hubs 52 and connecting with annular groove 57 cut around the periphery of the upper portion of tubes 49. Duct 56 is bored in the wall of each tube 49 and there may be one or more of such ducts which lead from annular groove 57 downwardly to annular groove 55 (Figure 12) which is also cut in the periphery of tube 49. This second annular groove 55 matches with an opening in the wall of tube 49 into which pipe nipple 50 is fastened. Air may thus be forced into or withdrawn from each article holder 60 by means of various passages and ducts thus described even though the entire tube 49, base 52 and article holder 60 are all in rapid rotation.

Air is compressed in each article holder compartment at certain predetermined intervals and withdrawn at other intervals in a manner now to be described. Pipe nipple 50 (Figure 12) is connected to pipe 164 which leads to a three-way valve 162 (Figure 1), from which pipe 165 leads to the above mentioned vacuum pump, and pipe 163 leads to an air compressor not shown. It is thus evident that either compressed air or a reduced air pressure may be directed to article holders 60 by simply rotating the handle of three-way valve 162 through an angle of approximately 90 degrees. This is done mechanically by means of an electric solenoid valve 186 (Figure 1). When the electric current is turned off valve 162 is connected to the vacuum pump so that the air compartment in each article holder 60 is, in its normal position, contracted. Compressed air is forced into this chamber by the action of cam 189 (Figure 1) on the end of rotating shaft 133, which cam serves to lift or tilt mercury switch 188 (Figure 6), thus making electric contact and causing solenoid 186 to draw solenoid tongue 187 upwards, thus opening the port in three-way valve 162 that leads from compressed air in pipe 163 to pipe 164 and simultaneously cutting off vacuum pump line 165 from pipe 164.

As soon as cam 189 lowers mercury switch 188 to its original position the electric current is shut off and three-way valve 162 returns, by the action of a spring not shown, to its normal position of being connected with the vacuum supply as heretofore described. Thus it is seen that article holders 60 may be contracted or expanded at precise predetermined times. At the proper instant when tubes 40 have been raised sufficiently to clear article holders 60, compressed air is applied and rubber sleeves 61 of article holders 60 are expanded in such manner as to seize articles 128, as shown in Figures 14, 19, and 20. This seizing, of course, is uniform about substantially the entire surface of articles 128, the amount of applied pressure being varied to an accurate degree by control of the air pressure used. This may be accomplished by a regulating valve in the compressed air line or by any other customary method and is not shown or described herein.

The next step is to twist articles 128 and Pliofilm sheet 7 that surrounds them. This is accomplished by twisting or turning article holders 60 in the following manner. The entire article holders 60 (Figure 14), including their bases or hubs 52 and tubes 49, are rotated by means of gears 72 rigidly fastened to said tubes. Spacers or thrust washers 73 separate rotatable tubes 49 from the fixed part of cylinder casting 48 (Figure 14). Gears 72 form a train of gears as shown in Figures 5 and 10, the end one of which 105 transmits power from shaft 106 on which it is pinned.

Shaft 106 is mounted in bearing 107 (Figure 5) and carries one-half of a jaw clutch 108 at its lower end. Directly beneath this half of jaw clutch 108 is the engaging part or the other half of this clutch 109 which revolves at all times in the following manner. Shaft 123 (Figure 3) derives its power to rotate as hereinbefore described. On shaft 123 is mounted sprocket 122 (Figures 3 and 6) which turns shaft 116 (Figure 3) by means of chain 121 and sprocket 120 (Figure 11). Shaft 116 (Figure 1) on which sprocket 120 is mounted, is housed in bearings 113 and these bearings are formed in a casting for the purpose of constituting a right-angle drive. To accomplish this, bevel gear 115 (Figure 11) mounted on shaft 116 (Figure 1) meshes with and turns bevel gear 114 (Figure 3) on the lower end of vertical shaft 110. Shaft 110 is housed in bearing 112 which is also a part of casting 113 which forms a part of the right-angle drive. Thus it is seen that the rotation of horizontal shaft 116 is converted into rotation of vertical shaft 110 whenever jaw clutch 109 engages its mate 108.

Lower jaw clutch 109 is slidably mounted, but is nevertheless keyed on to vertical shaft 110 and its vertical movement along this shaft is controlled by means of a yoke or fork on the end of cam arm 117 (Figure 3) functioning in groove 111 of the hub portion of jaw clutch 109. Cam arm 117 is fulcrumed around post 118 (Figure 1) which post is held in bracket 119 fastened to frame 1 and is actuated by cam roller 129 (Figure 3) rolling in box-cam 127 mounted on rotating shaft 133. As box-cam 127 causes lever arm 117 to rise, it lifts the lower half of jaw clutch 109 into engagement with the teeth of jaw clutch 108, causing the same to turn. This revolves shaft 106 as long as the jaw clutch teeth are so engaged. In this way gear 105 (Figure 10) and the train of gears 72 are turned. The turning of said gears causes tubes 49 and article holders 60 to be rotated. Thus, as shown in Figure 14, the partially wrapped articles are caused to turn or twist any predetermined amount and ordinarily this would be until the film 7 across the top of articles 128 has closed in on itself and sealed itself to the desired extent and tightness. If an object such as candy sucker with a stick or a cord protruding from the top thereof is being wrapped then film 7 will wind and constrict itself tightly around said stick or cord until a substantial seal has been made. Rotating tubes 49 may be lubricated by use of ordinary Alemite fittings 51 (Figure 14). Articles 128 and the sheet film 7 now have the appearance as shown in Figure 19. At this point cut-off wires 196 function to cut the wrapped articles 128 from the excess film. This severing operation is performed as follows. Insulating tubes 88 (Figure 22) have at their lower ends, rings of wire 196 which, when subjected to the proper electric potential will become heated without detriment to themselves. Insulating tubes 88 are clamped in position between angle-irons 87 (Figure 4) and fixed thereto by screws 89 (Figures 4 and 5). Angle-irons 87 are fastened at their ends to U-shaped members 90 (Figure 5) by screws 91 (Figure 12). U-shaped members 90 are firmly held on the ends of rods 92 the upper ends of which rods are connected to the tongues of solenoids 93 by bolts 97. Bolts 96 on the upper ends of rods 92 (Figure 5) strike against the upper ends of compression springs 94. The lower ends of springs 94 rest against stationary arms 95 rigidly fastened to upright posts 82 seated in castings 45 by bolts 83. Arms 95 are bored out to allow rods 92 to move vertically without impediment.

When electric current is turned into solenoids 93 it causes the tongues thereof to descend rapidly against compression springs 94 causing insulating tubes 88 and wire rings 196 (Figure 22) to descend against the stretched film 7 (Figure 12) severing the surplus film completely and instantly from the film on articles 128. The amount of heat used in wires 196 is controlled by rheostats in the usual manner. Electric current is fed to solenoids 93 by action of cam 191 (Figure 1) actuated by revolving shaft 133, raising or tilting mercury switch 190 to allow the mercury therein to complete electric contact through said solenoids 93. As soon as film 7 has been severed in this manner the air pressure in article holders 60 is released and the pressure may be actually reduced below atmospheric pressure by connection with the vacuum pump as heretofore explained. In this manner flexible sleeves 61 are drawn tightly against the walls of article holders 60 and articles 128, now wrapped, are allowed to fall through tubes 49. At substantially the same time, vacuum gate valve 174 (Figure 12) is lowered away from the openings of tubes 49 and wrapped articles 128 fall from tubes 49 across chute 180 (Figure 4) held by brackets 181 to frame 2, on to delivery belt 182 driven by pulley 183 on shaft 184 (Figure 3). Shaft 184 is driven by sprocket 185 (Figure 10) from chain 22.

Surplus film 8 is drawn forward, as previously explained, until it passes between wringer rolls 26 and 27, from which point it is rewound on to a spool, not shown, on shaft 9 (Figure 7) mounted in bearings 10. Shaft 9 is rotated by pulley 11 driven by leather belt 12 from smaller pulley 13 on lower wringer roll shaft 14 (Figure 1).

Electric switch 192 is for the main heating element in the oil line, not shown. Electric switch 193 is for the control of the secondary heating element in the oil line not shown.

Electric switch 194 is to control electric current to heat cut-off wires 196. Electric switch 195 is to control the motor pumping oil through pipe 38 (pump and motor not shown). Chain 22 (Figure 4) is kept tight by means of idler sprocket 161 (Figure 1).

An alternative method of heating and drawing the sheet film material through the machine is shown in Figures 22, 23, and 24. This method has been found to be efficient and practical and is described as follows. Film 7 on roll 4 is drawn from said roll by wringer rollers 15 and 16 in a manner similar to that used in the method heretofore described. After film 7 leaves said wringer rollers 15 and 16 it passes around a snubbing roll 205 which is free to rotate in arm 206 adjustably mounted on angle-irons 3. From snubber roll 205 film 7 is carried around a cylindrical heating drum 198 mounted on shaft 199 which is carried in bearings 200 bolted to frame 3. Chain 22 drives sprocket 207 on shaft 199. Oil which has been heated to a suitable temperature in any conventional manner or steam may be used to heat drum 198.

Grooves 203 (Figure 22, 23, and 24) are cut around the circumference of drum 198 and narrow belts 201 are carried in said grooves. Belts 201 are made of cotton fabric and serve to insulate this portion of film 7. In grooves 203 may be placed a layer of insulating material 208 as desired. Asbestos is preferable for this use. Narrow belts 201 pass around heating drum 198 as described and then pass between clamping plates 74 and 78, thence between wringer rolls 26 and 27 and downward around idlers 202 (Figure 22). Belts 201 are actually propelled by contact with drum 198 and also rollers 26 and 27. Since film 7 rests on belts 201 it is carried along or at least helped along by said belts. It should be noted that where film 7 passes over grooves 203 and belts 201 it is less heated and therefore less thermoplastic, so that this portion of film 7 is less stretchable and thus can itself be pulled through the apparatus by drum 198 and wringer rolls 26 and 27 more efficiently than would be the case if the entire surface of film 7 were heated and were completely thermoplastic. It should also be noted that these strips of cooler film register exactly between plunger tubes 40 at the next station of the machine operation. This helps to keep the film from being ruptured on the edges of cylinder openings 76 (Figure 7) when the film is stretched by tubes 40. One of the advantages of the cylindrical drum method of heating the film is that the film moves with the surface of the heating element rather than across such surface. Avoiding this friction, which is often extreme, between the film and the surface of the heating element reduces greatly the possibility of fracture of the film. Another advantage to this method of heating is that the heated film is peeled from the curved surface of the cylindrical drum more easily than it can be removed from a flat heating surface. This method also guarantees a close contact between the film and heating drum 198.

Across the face of heating drum 198 may be placed grooves 204 (Figure 24) lined with a suitable insulating material 208, preferably asbestos. Those portions of film 7 which contact insulated grooves 204 are less thermoplastic than the film which directly contacts drum 198. These less thermoplastic strips of said film subsequently register with contact edges 79 of clamp plate 78 and grooves 75 of bed-plate 74, thus providing a firmer grip on said film while the same is being stretched or extended by plunger tubes 40.

Referring to Figures 25 to 31, it will be seen how this same method and apparatus, when employed in the wrapping of such articles as packages or jars of merchandise 128a, causes the wrapping material to conform closely to the contour of the article being wrapped, regardless of its shape. The foregoing description of the operation as illustrated in Figures 15 to 21 is believed sufficient for a clear understanding of Figures 25 to 31, for with the exception of the accommodation of the handle 209 in the former, the steps are identical.

Briefly, I have disclosed as my invention a method of wrapping articles which consists of drawing from a supply roll a web of sheet film material which is preferably thermoplastic, stretchable, and sealable, heating predetermined portions thereof by passing the same across or around a heating element, moving the film across a series of openings arranged in predetermined lateral spaced relation, stretching or extending predetermined portions of the film into said openings by means of a series of tube-like plungers, retaining the pocket-like extensions in said film by means of a partial vacuum, depositing in said pockets the articles to be wrapped, forcing said film into tight covering engagement with said articles by means of fluid pressure, twisting both the article and the film covering until the package is substantially sealed, and cutting off the excess unused film.

While I have shown the preferred form of my invention as now known to me, I wish it understood that various changes may be made in the apparatus construction without departing from the spirit of my invention as defined in the appended claims.

Having thus described my invention, what I claim and desire to secure by Letters Patent is:

1. An apparatus for enclosing articles in elastic sheet material, including means for advancing a web of said material, means for heating predetermined portions of said web, means for suspending predetermined portions of said web over a plurality of openings, means for extending the heated portions of said web through said openings in pocket-like form, means for retaining said pocket-like extensions in said web after withdrawal of the pocket forming means, means for depositing in said pocket-like extensions the articles to be enclosed, means for turning said pocket-like extensions and the articles contained therein so as to substantially close said pockets about the articles to be wrapped, and means for severing the surplus web material from the wrapped articles.

2. An aparatus for enclosing articles in elastic sheet material, including means for advancing a web of said material, means for heating predetermined portions of said web, means for suspending predetermined portions of said web over a plurality of openings arranged in predetermined lateral spaced relation, means for extending the heated portions of said web through said openings in pocket-like form, means for retaining said pocket-like extensions in said web subsequent to the withdrawal of the pocket forming means, means for depositing in said pocket-like extensions the articles to be enclosed, means for turning said pocket-like extensions and the articles contained therein so as to close said pockets about the articles to be wrapped, and means for severing the surplus web material.

3. An apparatus for enclosing articles in thermoplastic sheet material including means for advancing a web of said material, means for heating predetermined portions of said web, means for suspending predetermined portions of said web over a plurality of laterally aligned openings, means for extending the heated portions of said web through said openings in pocket-like form, means for retaining said pocket-like extensions in said web after withdrawal of the last mentioned means, means for depositing in said pocket-like extensions the articles to be enclosed, means for forcing said extended sheet material into engagement with substantially the entire surface of said articles, means for twisting said sheet material together with said articles until complete enclosure is accomplished, and means for severing the surplus sheet material.

4. An apparatus for enclosing articles in elastic sheet material, including means for advancing a web of said material, means for heating predetermined portions of said web, means for intermittently suspending predetermined portions of said web over a plurality of openings, means for extending the heated portions of said web through said openings in pocket-like form, means for retaining said pocket-like extensions in said web after the withdrawal of said last mentioned means, and means for depositing in said pocket-like extensions the articles to be enclosed.

5. In an apparatus for enclosing articles in elastic sheet material, means for advancing a web of said material, means for heating predetermined portions of said web, means for intermittently suspending predetermined portions of said web over a plurality of laterally aligned openings, means for extending the heated portions of said web through said openings in pocket-like form, means for depositing in said pocket-like extensions the articles to be enclosed, means for twisting said pocket-like extensions and the articles contained therein so as to substantially close the uppermost portion of each pocket about the articles to be wrapped, and means for severing the surplus web material from the wrapped articles.

6. In an apparatus for enclosing articles in elastic sheet material, means for advancing a web of said material, means for heating predetermined portions of said web, means for suspending pre-determined portions of said web over a plurality of openings, means for extending the heated portions of said web through said openings in pocket-like form, means for depositing in said pocket-like extensions the articles to be enclosed, means for applying fluid pressure to force said extended sheet material into engagement with substantially the entire surface of said articles, means for turning said pocket-like extensions together with the articles contained therein until complete enclosure is accomplished, and means to sever the surplus sheet material.

7. An apparatus of the character described, including means for advancing a web of elastic sheet material, means for heating predetermined portions of said web, means for forming pocket-like extensions in said heated portions, means for depositing in said pocket-like extensions the articles to be enclosed, and means for simultaneously twisting said pocket-like extensions and the articles contained therein so as to enclose said articles in said sheet material.

8. An apparatus of the character described, including in combination, means for advancing a web of thermoplastic sheet material, a cylindrical heating element, a plate containing a plurality of laterally aligned openings, means for clamping and holding predetermined portions of said sheet material over said openings, a plurality of tube-like plungers adapted to extend said sheet material through said openings in pocket-like form, means for retaining said pocket-like extensions in said sheet material after withdrawal of the pocket forming means, means for depositing in said pocket-like extensions articles to be wrapped, means for twisting said pocket-like extensions together with said articles until said articles are completely enclosed, and means for severing the surplus sheet material.

9. In an apparatus for wrapping articles in elastic sheet material, the combination of a plurality of tube-like plungers, means for intermittently advancing a web of said material to a predetermined position beneath said plungers, means for moving said plungers downwardly against said sheet material so as to form pockets therein, means for retaining said pockets in said sheet material after withdrawal of said plungers, means for depositing in said pockets the articles to be wrapped, means for applying fluid pressure to said pockets to force the same to snugly engage substantially the entire surface of said articles, means for twisting said pockets together with the articles contained therein until complete enclosure is accomplished, and means to sever the surplus sheet material.

10. In the method of enclosing articles in sheet thermoplastic material, the steps of passing the sheet around a cylindrical heating element, forming a plurality of laterally aligned pockets in a predetermined portion of said heated sheet, depositing in said pockets the articles to be enclosed, and closing said pockets about said articles by twisting the pockets and the articles simultaneously.

11. In a machine for wrapping articles with a sheet of pliable material, a holding device comprising a substantially tubular body member, a flexible fluid retaining sleeve within said body member, means sealing the extremities of said sleeve against the walls of said body member, a sheet retaining member for supporting a sheet of pliable wrapping material across the upper end of said body member, means for inserting a portion of said sheet within said body member and for depositing an article to be wrapped, in the last mentioned portion of said sheet, an opening in one wall of said body member having means connected thereto for introducing a pressure fluid into the area between said sleeve and the walls of said body member, whereby said sleeve is caused to compress said sheet around said article and to assume substantially the shape of the latter and means for rotating one of said members with respect to the other to twist said sheet about said article.

12. In a machine for wrapping articles in elastic sheet material, a holding device comprising a substantially tubular body, a flexible fluid retaining lining in said body having its extremities sealed against the walls of said body, means for suspending a sheet of elastic wrapping material across the upper end of said body, means for inserting a portion of said sheet within said body member and for depositing an article to be wrapped, in the last mentioned portion of said sheet, means for gripping the projecting portion of said sheet to retain the same in a stationary position, an opening in one wall of said body having means connected thereto for introducing a pressure fluid into the area between said lining and the walls of said body, whereby said lining is caused to compress said sheet around said article in substantial conformity to the shape of the latter and means for rotating said body with respect to said sheet gripping means to cause said sheet to be twisted about said article.

13. A method of the character described, comprising heating predetermined portions of a web of elastic sheet material, forming pockets in the heated portions of the web, placing in said pockets articles to be wrapped, bringing together and closing the open ends of said pockets about the articles, and afterwards severing the pockets from said web.

14. A method of the character described, comprising heating predetermined portions of a web of elastic sheet material, forming pockets in the web by stretching the heated portions thereof at an angle to the plane of the web while holding the unheated portions in predetermined fixed positions, placing in said pockets articles to be wrapped, bringing together and sealing the open ends of said pockets about the articles, and afterwards severing the pockets from said web.

15. The method, according to claim 14, including bringing together and sealing the stretched material forming the open ends in closing said pockets about the articles and the further step of positively holding said pockets in stretched condition while the articles to be wrapped are deposited therein.

16. In the method of enclosing articles in a single sheet of thermoplastic material, the steps of heating the material, forming a plurality of laterally aligned pockets in a predetermined portion of said heated material, depositing in said pockets the articles to be enclosed, and closing and sealing said pockets about said articles by drawing together the sheet on opposite sides of the pocket.

17. An apparatus of the character described, including means for advancing a web of thermoplastic sheet material, means for heating predetermined portions of said material, means for forming pocket-like extensions in said heated portions, means for depositing in said pocket-like extensions the articles to be enclosed, and means for drawing together portions of the web on opposite sides of the articles to close and seal said pocket-like extensions around the articles.

WILLIAM S. CLOUD.